(12) United States Patent
Sukhadia et al.

(10) Patent No.: US 7,632,907 B2
(45) Date of Patent: Dec. 15, 2009

(54) POLYETHYLENE FILM HAVING IMPROVED MECHANICAL AND BARRIER PROPERTIES AND METHOD OF MAKING SAME

(75) Inventors: Ashish M. Sukhadia, Bartlesville, OK (US); Joel L. Martin, Bartlesville, OK (US); Qing Yang, Bartlesville, OK (US); Kumudini C. Jayaratne, Bartlesville, OK (US); J. Todd Lanier, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 395 days.

(21) Appl. No.: 11/427,019

(22) Filed: Jun. 28, 2006

(65) Prior Publication Data

US 2008/0004411 A1  Jan. 3, 2008

(51) Int. Cl.
  *C08F 210/00* (2006.01)
  *C08F 110/00* (2006.01)
  *C08F 110/02* (2006.01)
  *C08F 10/00* (2006.01)
  *C08F 8/00* (2006.01)
  *C08L 23/00* (2006.01)
  *C08L 23/04* (2006.01)
  *B32B 27/00* (2006.01)
  *B32B 27/08* (2006.01)

(52) U.S. Cl. ............... 526/348.1; 526/348; 526/352; 525/191; 525/240; 428/500; 428/515; 428/523; 428/98

(58) Field of Classification Search ............... 526/346, 526/352, 348.1, 348
See application file for complete search history.

(56) References Cited

U.S. PATENT DOCUMENTS

| | | | |
|---|---|---|---|
| 3,248,179 A | 4/1966 | Norwood | |
| 4,461,873 A | 7/1984 | Bailey et al. | |
| 4,501,885 A | 2/1985 | Sherk et al. | |
| 4,547,551 A | 10/1985 | Bailey et al. | |
| 4,588,790 A | 5/1986 | Jenkins, III et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 6,214,469 B1 | 4/2001 | Sukhadia et al. | |
| 6,239,235 B1 | 5/2001 | Hottovy et al. | |
| 6,262,191 B1 | 7/2001 | Hottovy et al. | |
| 6,355,359 B1 | 3/2002 | Sukhadia et al. | |
| 6,777,520 B2 * | 8/2004 | McLeod et al. | 526/348.1 |
| 6,833,415 B2 | 12/2004 | Kendrick et al. | |
| 7,119,153 B2 | 10/2006 | Jensen et al. | |
| 2002/0042490 A1 * | 4/2002 | McLeod et al. | 526/348.1 |
| 2003/0030174 A1 * | 2/2003 | Gray et al. | 264/171.28 |
| 2003/0194575 A1 * | 10/2003 | Tau et al. | 428/515 |
| 2005/0137342 A1 * | 6/2005 | Krishnaswamy et al. | 525/240 |
| 2006/0177641 A1 * | 8/2006 | Breese et al. | 428/220 |

FOREIGN PATENT DOCUMENTS

WO  WO 2004/101674  * 10/2004

OTHER PUBLICATIONS

Bird, R. Byron, et al., "Dynamics of Polymeric Liquids," A Wiley-Interscience Publication, vol. 1—Fluid Mechanics, Second Edition, 1987, 10 pgs.
Hieber, C.A., et al., "Some correlations involving the shear viscosity of polystyrene melts," Rheologica Acta, vol. 28, No. 4, 1989, pp. 321-332.
Hieber, C.A., et al., "Shear-Rate-Dependence Modeling of Polymer Melt Viscosity," Polymer Engineering and Science, vol. 32, No. 14, Jul. 1992, pp. 931-938.
Patent application entitled "Polymerization Catalysts and Process for Producing Bimodal Polymers in a Single Reactor," filed Aug. 22, 2005, U.S. Appl. No. 11/209,006.
Patent application entitled "Polymerization Catalysts and Process for Producing Bimodal Polymers in a Single Reactor," filed Sep. 15, 2005, U.S. Appl. No. 11/208,077.
Foreign Communication from a related counterpart application—Declaration of Non-Establishment of International Search Report, PCT/US2007/072320, Nov. 29, 2007, 2 pages.
Foreign Communication from a related counterpart application—Written Opinion of the International Searching Authority, PCT/US2007/072320, Nov. 29, 2007, 4 pages.

* cited by examiner

*Primary Examiner*—Vasu Jagannathan
*Assistant Examiner*—Irina Krylova
(74) *Attorney, Agent, or Firm*—Conley Rose, P.C.; Rodney B. Carroll; Cheryl L. Huseman

(57) ABSTRACT

A polyethylene film comprising a polymer composition having the characteristics of a total energy dart drop, measured in accordance with ASTM D4272, of greater than about 0.45 ft.lbf, a dart drop impact strength, measured in accordance with ASTM D1709 Method A, of greater than about 135 g, and a moisture vapor transmission rate, measured in accordance with ASTM F1249 at 100° F. and 90% relative. humidity, of less than about 0.85 g-mil/100 square inch/24 hr, wherein said ASTM tests are performed on a test specimen having a 0.8 mil thickness.

20 Claims, 2 Drawing Sheets

POLYETHYLENE FILM HAVING IMPROVED MECHANICAL AND BARRIER PROPERTIES AND METHOD OF MAKING SAME

FIELD OF THE INVENTION

The present disclosure relates to polymer compositions and film made from same, more specifically to polyethylene compositions for the manufacture of high molecular weight, high density films.

BACKGROUND OF THE INVENTION

Polyolefins are plastic materials useful for making a wide variety of valued products due to their combination of stiffness, ductility, barrier properties, temperature resistance, optical properties, availability, and low cost. One of the most valued products are plastic films. In particular, polyethylene (PE) is the one of the largest volume polymers consumed in the world. It is a versatile polymer that offers high performance relative to other polymers and alternative materials such as glass, metal or paper. Plastic films such as PE films are mostly used in packaging applications but they also find utility in the agricultural, medical and engineering fields.

PE films are manufactured in a variety of grades that are usually differentiated by the polymer density such that PE films can be designated for example, low density polyethylene (LDPE), medium density polyethylene (MDPE) and, high density polyethylene (HDPE) wherein each density range has a unique combination of properties making it suitable for a particular application. For example, a HDPE film may be used in packaging applications, requiring superior impact properties. HDPE is a type of PE composed primarily of long, linear hydrocarbon chains and the resultant polymer is tightly packed and crystalline. ADPE relative to other PE films is notable for its toughness, rigidity, increased tensile strength, abrasion resistance, stability and chemical resistance.

Despite the many positive attributes of HDPE, the film product is permeable to gases such as oxygen or carbon dioxide. Thus, it would be desirable to develop an HDPE film product exhibiting a combination of good mechanical properties such as a high impact or tensile strength and good barrier properties such as a low oxygen vapor transmission rate.

SUMMARY OF THE INVENTION

Disclosed herein is a polyeylene film comprising a polymer composition having the characteristics of a total energy dart drop, measured in accordance with ASTM D4272, of greater than about 0.45 ft.lbf, a dart drop impact strength, measured in accordance with ASTM D1709 Method A, of greater than about 135 g, and a moisture vapor transmission rate, measured in accordance with ASTM F1249 at 100° F. and 90% relative humidity, of less than about 0.85 g-mil/100 square inch/24 hr, wherein said ASTM tests are performed on a test specimen having a 0.8 mil thickness.

Also disclosed herein is a polyethylene film comprising a polymer composition having the characteristics of a total energy dart drop, measured in accordance with ASTM D4272, of greater than about 0.45 ft.lbf, a dart drop impact strength, measured in accordance with ASTM D1709 Method A, of greater than about 135 g, and an oxygen transmission rate, measured in accordance with ASIM D3985 at 73° F. and 0% relative humidity, of less than about 400 $cm^3$-mil/100 square inch/24 hr, wherein said ASTM tests are performed on a test specimen having a 0.8 mil thickness.

Further disclosed herein is a polyethylene film comprising a polymer composition having the characteristics of a total energy dart drop, measured in accordance with ASTM D4272, of greater than about 0.45 ft.lbf, a dart drop impact strength, measured in accordance with ASTM D1709 Method A, of greater than about 135 g, and a 1% machine direction secant modulus, measured in accordance with ASTM D882 at 10.2 mm/min, of equal to or greater than about 130,000 psi, wherein said ASTM tests are performed on a test specimen having a 0.8 mil thickness.

Further disclosed herein is a polyethylene film comprising a polymer composition having the characteristics of a total energy dart drop, measured in accordance with ASTM D4272, of greater than about 0.45 ft.lbf, a dart drop impact strength, measured in accordance with ASTM D1709 Method A, of greater than about 135 g, and a 1% transverse direction secant modulus, measured in accordance with ASTM D882 at 10.2 mm/min, of equal to or greater man about 170,000 psi, wherein said ASTM tests are performed on a test specimen having a 0.8 mil thickness.

Further disclosed herein is a polyethylene film comprising a polymer composition having an "a" value of greater than about 0.45, an "eta zero" value of less than about $4 \times 10^5$ Pa·s, and a "tau eta" value of less than about 5 s, when fitted to the Carreau-Yasuda equation with an n=0.1818 value and wherein the film displays a moisture vapor transmission rate equal to or less than about 0.85 g-mil/100 sq. in/day determined in accordance with ASTM F1249 and a total energy dart drop impact of equal to or greater than about 1.0 ft.lbf as determined in accordance with ASTM D4272 when performed on a test specimen having a 0.8 mil thickness.

DETAILED DESCRIPTION OF THE INVENTION

Figure 1:
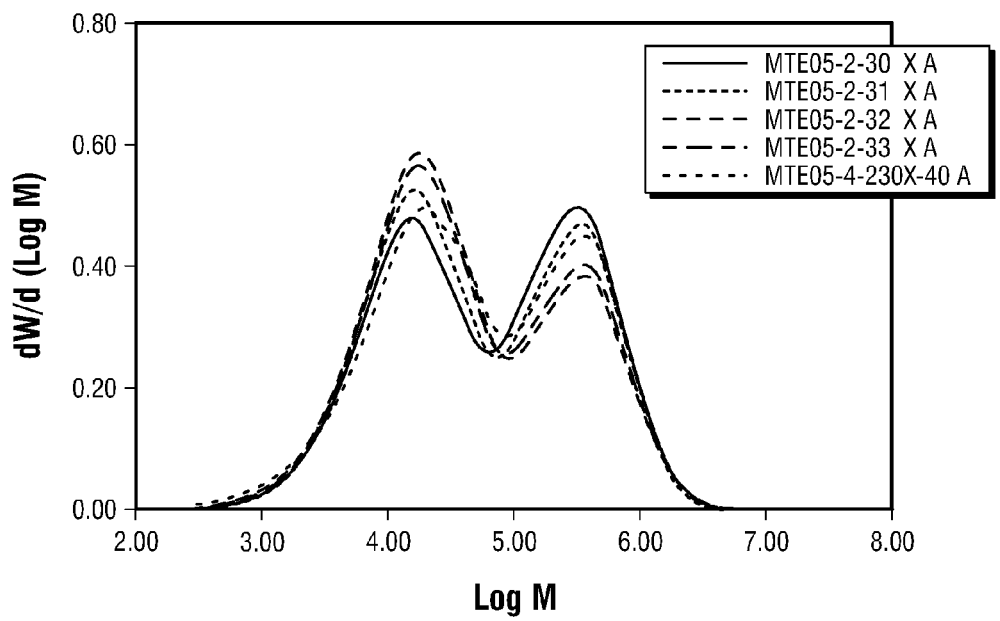
FIG. 1 is a plot of the molecular weight distribution of the five experimental resins of Example 1.

Disclosed herein are polyethylene (PE) compositions, PE films, and methods of making same. Such methods may comprise preparing a PE composition and forming the composition into a film. The PE composition may comprise a PE base resin and optionally additives or modifiers. In an aspect, the PE composition comprises a multimodal PE resin and the film prepared there from may display enhanced mechanical and barrier properties such as increased impact strength and a reduced moisture vapor and/or oxygen transmission rate.

The PE base resin may be a unimodal resin, alternatively a multimodal resin. Herein, the "modality" of a polymer resin refers to the form of its molecular weight distribution curve, i.e. the appearance of a graph of the polymer weight fraction, frequency, or number as a function of its molecular weight. The polymer weight fraction refers to the weight fraction of molecules of a given size. A polymer resin may have two or more components that may be distinguishable from one another, for example based upon their individual composition and/or molecular weight distribution. A molecular weight distribution curve may be prepared for each individual component of the polymer resin.

The molecular weight distribution curves for the individual components may be superimposed onto a common chart to form the weight distribution curve for the polymer resin as a whole. Upon such superimposition, the resultant curve for the polymer resin as a whole may be multimodal or show n distinct peaks corresponding to n polymer components of differing molecular weight distributions. For example, a polymer having a molecular weight distribution curve showing a single peak may be referred to as a unitmodal polymer, a polymer having a curve showing two distinct peaks may be referred to as a bimodal polymer, a polymer having a curve showing three distinct peaks may be referred to as a trimodal polymer, etc. Polymers having molecular weight distribution curves showing more than one peak may be collectively referred to as multimodal polymers or resins. Furthermore, the distinct peaks may correspond to components exhibiting distinct characteristics. For example, a bimodal polymer resin may show two distinct peaks corresponding to two individual components of differing molecular weights. Said bimodal polymer resin may have a first component that may be generally characterized as a higher molecular weight polymer component and a second component that may be generally characterized as a lower molecular weight polymer component. Alternatively, superimposition of the molecular weight distribution curves from the individual components may show a single peak that is broadened in comparison with the curves for the individual components corresponding to polymer fractions having different but overlapping molecular weight distributions. In an embodiment, the multimodal PE composition comprises a bimodal PE base resin. The remainder of the discussion will focus on bimodal PE compositions with the understanding that other polymeric compositions, for example having different modality, may be employed in various aspects and embodiments as would be apparent to one skilled in the art.

The PE composition and/or individual components of the PE composition may comprise a homopolymer, a copolymer, or blends thereof. In an embodiment, the components of the PE composition may be a copolymer comprised of a polymer of ethylene with one or more comonomers such as alpha olefins. In an embodiment, the PE composition comprises a higher molecular weight ethylene/1-olefin copolymer (AWN component and a lower molecular weight ethylene/1-olefin copolymer (LMW) component. The comonomer of the HMW component of the PE composition may be the same as or different from the comonomer of the LMW component. Examples Of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an embodiment, the comonomer for the LMW component and HMW component of the PE composition is 1-hexene.

The PE compositions of this disclosure and/or the base PE resin may include other additives as known to those skilled in the art. Examples of additives include, but are not limited to, antistatic agents, colorants, stabilizers, nucleators, surface modifiers, pigments, slip agents, antiblocks, tackafiers, polymer processing aids and combinations thereof. In an embodiment, the PE composition comprises carbon black. Such additives may be used singularly or in combination and may be included in the polymer composition before, during or after preparation of the PE composition as described herein. In an embodiment, the compositions disclosed herein comprise less than about 1 weight percent of nonpolymeric additives. Such additives may be added via known techniques, for example during an extrusion or compounding step such as during pelletization or subsequent processing into an end use article.

The PE compositions disclosed herein may have a variety of properties and parameters described below either singularly or in combination. Methods for determination of these properties and parameters are known to one of ordinary skill in the art.

The molecular weight distribution (MWD) of the PE composition may be characterized by the ratio of the weight average molecular weight to the number average molecular weight, which is also referred to as the polydispersity index (PDI) or more simply as polydispersity. The number average molecular weight ($M_n$) is the common average of the molecular weights of the individual polymers calculated by measuring the molecular weight of n polymer molecules, summing the weights, and dividing by n. The weight average molecular weight ($M_w$) of a polymer composition is calculated according to equation 1:

$$M_w = \frac{\sum_i n_i M_i^2}{\sum_i n_i M_i} \quad (1)$$

where $n_i$ is the number of molecules of molecular weight $M_i$. All molecular weight averages are expressed in gram per mote (g/mol). Various moments of the MWD include $M_n$, $M_w$, $M_z$, and $M_v$.

In an embodiment, the PE composition of this disclosure has a weight average molecular weight of from about 180,000 g/mol to about 350,000 g/mol alternatively, from about 180,000 g/mol to about 300,000 g/mol alternatively, from about 200,000 g/mol to about 300,000 g/mol. In an embodiment, the HMW component may have a PDI of equal to or less than about 5.5, alternatively equal to or less than about 5.0, alternatively equal to or less than about 4.5, or alternatively equal to or less than about 4.0. In an embodiment, the LMW component may have a PDT of equal to or less than about 10, alternatively equal to or less than about 8, alternatively equal to or less than about 7, or alternatively equal to or less than about 6. The resultant PE composition (i.e. including both the LMW and HMW components) may have a broad MWD of equal to or greater than about 8, alternatively equal to or greater than about 10, or alternatively equal to or greater than about 12.

The high load melt index (HLMI) represents the rate of flow of a molten resin through an orifice of 0.0825 inch diameter when subjected to a force of 21,600 grams at 190° C. as determined in accordance with ASTM D1238. The PE compositions of this disclosure may have a HLMI of from about 1 g/10 min to about 30 g/10 min, alternatively from about 2 g/10 min to about 25 g/10 min, or alternatively from about 7 g/10 min to about 15 g/10 min.

The PE compositions of this disclosure may be further characterized by having a density of equal to or greater than about 0.940 g/cc, alternatively equal to or greater than about 0.450 g/cc, alternatively equal to or greater than about 0.952 g/cc. The density refers to the mass perunit volume of polymer and may be determined in accordance with ASTM D1505.

The PE compositions of this disclosure may be further characterized as having a limited rheological breadth. Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated linear-viscoelastic dynamic oscillatory frequency sweep experiments with a modified Carreau-Yasuda (CY) model, which is represented by the following equation:

$$E = E_o[1 + (T_\xi \gamma \&)^a]^{\frac{n-1}{a}}$$

where

E=viscosity (Pa·s)

&=shear rate (1/s)

a=rheological breadth parameter $T_\xi$=relaxation timen (s) [describes the location in time of the transition region]

$E_o$=zero shear viscosity (Pa·s) [defines the Newtonian plateau]

n=power law constant [defines the final slope of the high shear rate region]

To facilitate model fitting, the power law constant is held at a constant value. Details of the significance and interpretation of the CY model and derived parameters may be found in: C. A. Hieber and H. H. Chiang, *Rheol Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987), each of which is incorporated by reference herein in its entirety.

In an embodiment, the PE composition of this disclosure has an "eta zero" ($E_o$) value of less than about $4 \times 10^5$ Pa·s, alternatively less than about $1 \times 10^5$ Pa·s, alternatively less than about $9 \times 10^4$ Pa·s when the dynamic complex viscosity versus frequency scan are fitted to the Carreau-Yasuda equation with an n=0.1818 value. In an embodiment, the PE composition of this disclosure has an "a" value of greater than 0.30, alternatively greater than 0.40, alternatively greater than 0.45 wherein the dynamic complex viscosity versus frequency scan are fitted to the Carreau-Yasuda equation with an n=0.1818 value. In an embodiment, the PE composition of this disclosure has an "tau eta" ($T_\xi$) value of less than about 5 s, alternatively less than about 1 s, alternatively less than about 0.55 s wherein the dynamic complex viscosity versus frequency scan are fitted to the Carreau-Yasuda equation with an n=0.1818 value.

The PE composition of the present disclosure can be formed by any olefin polymerization method known in the art, using various types of polymerization reactors. As used herein, "polymerization reactor" includes any polymerization reactor capable of polymerizing olefin monomers to produce homopolymers or copolymers. Such homopolymers and copolymers are referred to as resins, polymers, polyolefins, or PEB. These could include slurry, gas-phase, solution, high pressure, tubular or autoclave reactors. Gas phase reactors may comprise fluidized bed reactors or staged horizontal reactors. Slurry reactors may comprise vertical or horizontal loops. High-pressure reactors may comprise autoclave or tubular reactors. Reactor types can include those that may be referred to as continuous or batch. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high-pressure reactors or a combination of high pressure with loop and/or gas reactors. The multiple reactors may be operated in series or in parallel.

According to one aspect of the disclosure the polymerization reactor system may comprise at least one loop slurry reactor. Such reactors are known in the art and may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to separate the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugal force.

A typical slurry polymerization process (also known as the particle form process), which is well known in the art is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization are well known in the art and include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the disclosure, a high-pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stiring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for use in the present disclosure may further comprise any combination of at least one raw material feed system, at least one feed system for catalyst or catalyst components, and/or at least one polymer recovery system. Suitable reactor systems for use in the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperatures may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the properties. Mechanical properties include tensile, flexural, impact, creep, fracture (impact and slow crack growth) resistance, stress relaxation and hardness tests. Physical properties include density, molecular weight, molecular weight distribution, melting temperature, glass transition temperature, crystallization temperature, stereoregularity, long chain branching and melt rheology.

The concentrations of monomer, co-monomer, hydrogen, co-catalyst, modifiers, and electron donors are important in producing these resin properties. Comonomer may be used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

Any catalyst composition capable of producing a PE composition may be employed in the production of the PE composition. Typical catalyst compositions that can be employed include supported chromium catalysts, Ziegler-Natta catalysts, metallocene catalysts, or combinations thereof For example, a catalyst composition for the production of a PE composition may include at least two metallocenes that are selected such that the polymers produced therefrom have two distinctly different molecular weights. The first metallocene may be used to produce the HMW component, and may be a tightly bridged metallocene containing a substituent that includes a terminal olefin. The second metallocene, that may be used to produce the LMW component, is generally not bridged and is more responsive to chain termination reagents, such as hydrogen, the first metallocene. The metallocenes may be combined with an activator, an aluminum alkyl compound, an olefin monomer, and an olefin comonomer to produce the desired bimodal polyolefin. The activity and the productivity of the catalyst may be relatively high. As used herein, the activity refers to the grams of polymer produced per gram of solid catalyst charged per hour, and the productivity refers to the grams of polymer produced per gram of solid catalyst charged. Such catalysts are disclosed in U.S. patent application Ser. No. 11/209,006, filed Aug. 22, 2005 and entitled "Polymerization Catalysts And Process For Producing Bimodal Polymers In A Single Reactor," and U.S. patent application Ser. No. 11/208,077, filed Sep. 15, 2005 and entitled "Polymerization Catalysts and Process for Producing Bimodal Polymers in a Single Reactor," each of which is incorporated herein by reference in its entirety.

In an embodiment, a catalyst composition comprises a first metallocene compound, a second metallocene compound, an activator and optionally an organoaluminum compound. The first metallocene compound has the formula:

$$(X^1R^1)(X^2R^2_2)(X^3)(X^4)M^1;$$

wherein ($X^1$) is cyclopentadienyl, indenyl, or fluorenyl, ($X^2$) is fluorenyl, and ($X^1$) and ($X^2$) are connected by a disubstituted bridging group comprising one atom bonded to both ($X^1$) and ($X^2$), wherein the atom is carbon or silicon. A first substituent of the disubstituted bridging group is an aromatic or aliphatic group having from 1 to about 20 carbon atoms. A second substituent of the disubstituted bridging group can be an aromatic or aliphatic group having from 1 to about 20 carbon atoms, or the second substituent of the disubstituted bridging group is an unsaturated aliphatic group having from 3 to about 10 carbon atoms. $R^1$ is H, or an unsaturated aliphatic group having from 3 to about 10 carbon atoms. $R^2$ is H, an alkyl group having from 1 to about 12 carbon atoms, or an aryl group; $(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide; and $M^1$ is Zr or Hf. The first substituent of the disubstituted bridging group may be a phenyl group. The second substituent of the disubstituted bridging group may be a phenyl group, an alkyl group, a butenyl group, a pentenyl group, or a hexenyl group.

The second metallocene compound has the formula:

$(X^5)(X^6)(X^7)(X^8)M^2;$ wherein $(X^5)$ and $(X^6)$ are independently a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alyl group or alkenyl group is unsubstituted or substituted, any substituent on $(X^5)$ and $(X^6)$ having from 1 to about 20 carbon atoms; $(X^7)$ and $(X^8)$ are independently an aliphatic group, an aromatic group, a cyclic group, a combination of aliphatic and cyclic groups, or a substituted derivative thereof, having from 1 to about 20 carbon atoms; or a halide, and $M^2$ is Zr or Hf.

In an embodiment of the present disclosure, the ratio of the first metallocene compound to the second metallocene compound may be from about 1:10 to about 10:1. According to other aspects of the present disclosure, the ratio of the first metallocene compound to the second metallocene compound may be from about 1:5 to about 5:1. According to yet other aspects of the present disclosure, the ratio of the first metallocene compound to the second metallocene compound may be from about 1:2 to about 2:1.

In an embodiment of the present disclosure, the activator may be a solid oxide activator-support, a chemically treated solid oxide, a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, an aluminoxane, a supported aluminoxane, an ionizing ionic compound, an organoboron compound, or any combination thereof. The terms "chemically-treated solid oxide", "solid oxide activator-support", "acidic activator-support", "activator-support", "treated solid oxide compound", and the like are used herein to indicate a solid, inorganic oxide of relatively high porosity, which exhibits Lewis acidic or Bronsted acidic behavior, and which has been treated with an electron-withdrawing component, typically an anion, and which is calcined. The electron-withdrawing component is typically an electron-withdrawing anion source compound. Thus, the chemically-treated solid oxide compound comprises the calcined contact product of at least one solid oxide compound with at least one electron-withdrawing anion source compound. Typically, the chemically-treated solid oxide comprises at least one ionizing, acidic solid oxide compound. The terms "support" and "activator-support" are not used to imply these components are inert, and such components should not be construed as an inert component of the catalyst composition.

The organoaluminuum compound used with the present disclosure may have the formula:

$(R^3)_3Al;$ in which $(R^3)$ is an aliphatic group having from 2 to about 6 carbon atoms. In some instances, $(R^3)$ is ethyl, propyl, butyl, hexyl, or isobutyl.

In an embodiment, the catalysts are chosen from compounds like those represented by the chemical structures A and B with sulfated alumina as the activator-support and with tri-isobutylaluminum (TIBA) as the co-catalyst.

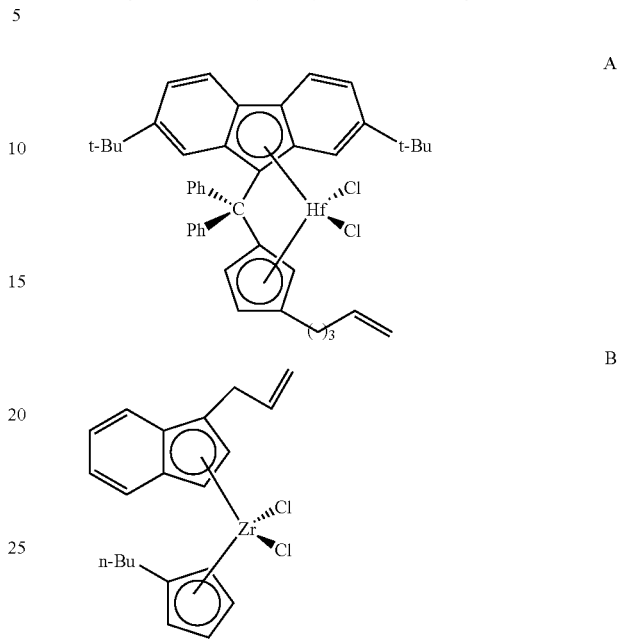

In an embodiment, the PE composition of this disclosure is fabricated into a film. The films of this disclosure may be produced by any method and under any conditions known to one skilled in the art for the production of films. In an embodiment, the polymeric compositions are formed into films through a blown film process. In a blown film process, plastic melt is extruded through an annular slit die, usually vertically, to form a thin walled tube. Air may then be introduced via a hole in the center of the die to blow up the tube like a balloon. Mounted on top of the die, a high-speed air ring blows onto the hot film to cool it. The tube of film then continues upwards, continually cooling, until it passes through nip rolls where the tube is flattened to create what is known as a lay-flat tube of film. This lay-flat or collapsed tube is then taken back down the extrusion tower via more rollers. On higher output lines, the air inside the bubble is also exchanged. This is known as Internal Bubble Cooling (IBC).

The lay-flat film is then either kept as such or the edges of the lay-flat are slit off to produce two flat film sheets and wound up onto reels. Typically, the expansion ratio between die and blown tube of film would be 1.5 to 4 times the die diameter. The drawdown between the melt wall thickness and the cooled film thickness occurs in both radial and longitudinal directions and is easily controlled by changing the volume of air inside the bubble and by altering the haul off speed. The films formed from PE compositions of this disclosure may be of any thickness desired by the user. Alternatively, the PE compositions of this disclosure may be formed into films having a thickness of from about 0.1 mils to about 5 mils, alternatively from about 0.2 mils to about 1.5 mils, alternatively from about 0.3 mils to about 1.0 mils.

In an embodiment, the films formed from PE compositions of this disclosure may display enhanced mechanical and/or barrier properties. For example said films may display increased strength, impact resistance and, stiffness while displaying reduced moisture vapor and/or oxygen transmission rates.

In an embodiment the films formed from PE compositions of his disclosure may display an increased impact strength as indicated by an increased total energy dart drop strength (TEDD). The TEDD measures the total failure energy absorbed by a film specimen impacted by a falling dart under specified test conditions. Typically, a 38.1 mm (1.5 in) diameter hemispherical head dart is dropped from 66 cm (26 in) and impacts a test specimen. After passing through the test specimen, the dart passes through a speed trap made of a pair of photoelectric sensors that measure the time it takes for the dart to cover a given distance. The time it takes for the dart to pass through the speed trap after passing through the specimen is referred to as the test-fall time, while the time through the speed trap without a specimen is called the free-fall time. The energy absorbed by the specimen is equated to the loss of kinetic energy of the dart and is determined using the formula: $E=(m/2 \ g)[d^2(1/t_1^2+1/t_2^2)+(g^2/4)(t_1^2-t_2^2)]$ where E is the energy required to rupture the specimen (J), m is the mass of the dart (kg), g is the gravitational constant (9.81 m/s$^2$), d is the distance between the photoelectric sensors (m), $t_1$ is the free-fall time (s), and $t_2$ is the test-fall time (s). In an embodiment, the films formed from the PE compositions of this disclosure have a TEDD of equal to or greater than about 0.45 ft.lbf, alternatively, equal to or greater than about 0.7 ft.lbf, alternatively, equal to or greater than about 1.0 ft.lbf as measured in accordance with ASTM D4272 using a test specimen having a 0.8 mil thickness.

In an embodiment the films formed from PE compositions of this disclosure may display an increased impact strength as indicated by an increased dart drop strength. The dart drop strength refers to the weight required to cause 50% of tested films. to fail by impact from a falling dart under specified test conditions. Specifically, one method employs the use of a dart having a 38 mm (1.5 in) head diameter dropped from a height of 0.66 m (26.1 in). In an embodiment, the films formed from the PE compositions of this disclosure have a dart drop of equal to or greater than about 135 g, alternatively equal to or greater than about 165 g, alternatively equal to or greater than about 200 g as measured in accordance with ASTM D1709 Method A using a test specimen having a 0.8 mil thickness.

In an embodiment the films formed from PE compositions of this disclosure may display an increased impact strength as indicated by an increased Spencer impact. Spencer impact measures the energy necessary to burst and penetrate the center of a specimen, mounted between two rings with a 3.5 inch diameter. The following formula may be used to obtain an impact value in joules:

$$E=RC/100$$

where E is the energy to rupture, Joules, C is the apparatus capacity and, R is the scale reading on a 0 to 100 scale. In an embodiment, the films formed from the PE compositions of this disclosure have a Spencer impact of equal to or greater than about 0.45 J, alternatively equal to or greater than about 0.55 J, alternatively equal to or greater than about 0.60 J as measured in accordance with ASTM D3420 using a test specimen having a 0.8 mil thickness.

In an embodiment the films formed from PE compositions of this disclosure may display an increased tear strength as indicated by an increased Elmendorf tear strength. The Elmendorf tear strength refers to the average force required to propagate tearing through a specified length of plastic film or nonrigid sheeting on an Elmendorf-type tear tester. Specifically, test specimens having a pre-cut slit are contacted with a knife-tipped pendulum. The average force required to propagate tearing is calculated from the pendulum energy lost while tearing the test specimen. The tear may be propagated either in the machine direction (MD) or transverse direction (TD). In an embodiment, the films formed from the PE compositions of this disclosure have an Elmendorf tear strength in the TD of equal to or greater than about 85 g, alternatively equal to or greater about 100 g, alternatively equal to or greater about 120 g as measured in accordance with ASTM D1922 using a test specimen having a 0.8 mil thickness.

In an embodiment, the films formed from PE compositions of this disclosure may display improved barrier properties such as a reduced oxygen transmission rate (OTR) and/or moisture vapor transmission rate (MVTR). OTR is the measurement of the amount of oxygen gas that passes through a film over a given period. Testing may be conducted under a range of relative humidity conditions at a range of temperatures. Typically, one side of the film is exposed to the oxygen permeant. As it solubilizes into the film and permeates through the sample material, nitrogen sweeps the opposite side of the film and transports the transmitted oxygen molecules to a coulometric sensor. This value is repoted as a transmission rate. When this rate is multiplied by the average thickness of the material, the results are considered a permeability rate. In an embodiment, the films formed from the PE compositions of this disclosure have an OTR of equal to or less than about 400 cm$^3$-mil/100 sq.in/day, alternatively, equal to or less than about 370 cm$^3$-mil/100 sq.in/day, alternatively equal to or less than about 350 cm$^3$-mil/100 sq.in/day as measured in accordance with ASTM D3985.

The MVTR measures passage of gaseous H$_2$O through a barrier. The MVTR may also be referred to as the water vapor transmission rate; (WVTR). Typically, the MWTR is measured in a special chamber, divided vertically by the substrate/barrier material. A dry atmosphere is in one chamber, and a moist atmosphere is in the other. A 24-hour test is run to see how much moisture passes through the substrate/barrier from the "wet" chamber to the "dry" chamber under conditions which can specify any one of five combinations of temperature and humidity in the "wet" chamber. In an embodiment, the films formed from the PE compositions of this disclosure have an MVTR of equal to or less than about 0.85 g-mil/100 sq.in/day, alternatively equal to or less than about 0.75 g-mil/100 sq.in/day, alternatively equal to or less than about 0.70 g-mil/100 sq.in/day as measured in accordance with ASTM F 1249 at 100° F. and 90% relative humidity (RH).

In an embodiment, the films formed from PE compositions of this disclosure may display improved stiffness as evinced by an increased secant modulus. The secant modulus is a measure of the rigidity or stiffness of a material. It is basically the applied tensile stress, based on the force and cross-sectional area, divided by the observed strain at that stress level. It is generally constant before the material approaches the point at which permanent deformation will begin to occur. In an embodiment, the films formed from PE compositions of this disclosure may display a 1% secant modulus in the TiD of equal to or greater than about 170 kpsi, alternatively equal to or greater than about 180 kpsi, alternatively equal to or greater than about 190 kpsi as determined in accordance with ASTM D882. In an embodiment, the films formed from PE compositions of this disclosure may display a 1% secant modulus in the MD of equal to or greater than about 130 kpsi, alternatively equal to or greater than about 140 kpsi, alternatively equal to or greater than about 145 kpsi as determined in accordance with ASTM D882, using a test specimen having a 0.8 mil thickness.

In an embodiment, the films produced by the compositions and methods of this disclosure may display a unique combination of increased toughness, increased stiffness and improved barrier properties at the disclosed densities. The films of this disclosure may be used in the formation of any variety of end-use articles such as for example merchandise bags, t-shirt bags, trash can liners, grocery sacks, produce bags, food packaging for contents such as cereals, crackers, cheese, meat, etc., shrink wrap and, other items as known to one of ordinary skill in the art.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Five experimental resins, designated MTE05-230X, MTE05-32X, MTE05-33X, MTE05-31X and, MTE05-30X, were prepared using a dual metallocene catalyst. The resin density, HLMI and MI are presented in Table 1.

mil thick films. The thickness of the film may also be referred to as the film gage.

Example 1

Figure 2:
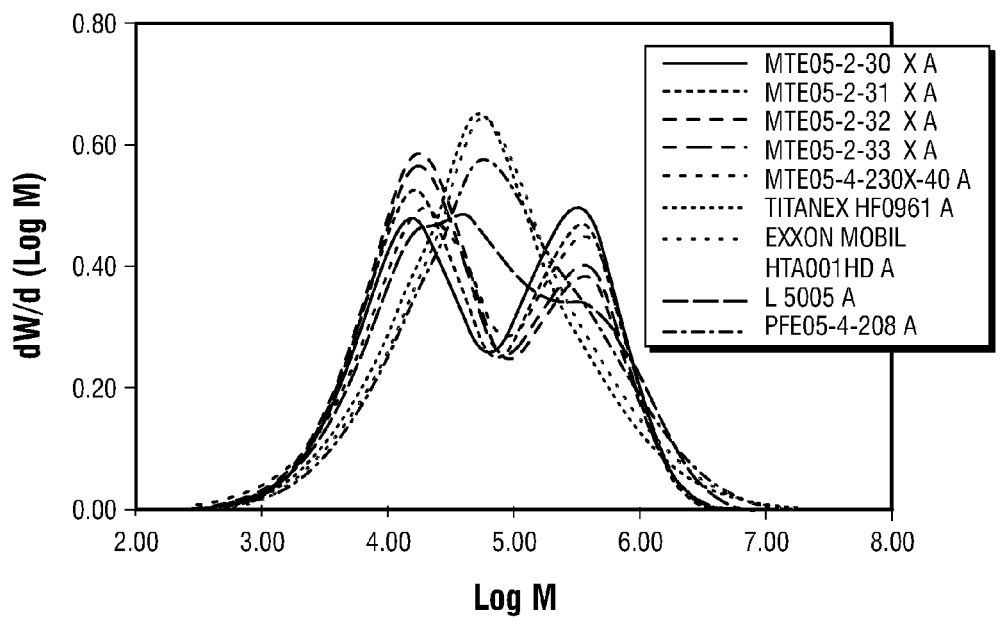
FIG. 2 is a plot of the molecular weight distribution for all of the resins of Example 1.

The gel permeation chromatography and rheology characteristics of the experimental and comparison resins were evaluated. FIG. 1 shows the GPC overlays of the five experimental resins Resins MTE05-30X, MTE05-31X, MTE05-32X and MTE05-33X all maintain relatively the same high and low $M_w$ component peak positions but vary in the relative ratio of the two components. The high-$M_w$ faction increases in the order MTE05-32X<MTE05-33X<MTE05-31X<MTE05-30X. Referring to Table 1, this increase in the high-$M_w$ weight fraction is consistent with a lowering of the HLMI from ~23 to ~7. Resin MTE05-230X has a slightly different GPC profile compared to the other experimental resins and is most similar to resin MTE05-31X. FIG. 2 shows the GPC of both the experimental and comparative resins. FIG. 2 shows that experimental resins while distinctly bimo-

TABLE 1

| Resin Description | Comments | Film (mil) | Film (micron) | Density (g/cm³) | HLMI (g/10 min) | MI (g/10 min) | HLMI/ |
|---|---|---|---|---|---|---|---|
| Alathon L5005 | | 0.8 | 20 | 0.9490 | 8.38 | 0.04 | 210 |
| ExxonMobil HT | | 0.8 | 20 | 0.9524 | 8.75 | 0.06 | 146 |
| Titanex HF-0961 | | 0.8 | 20 | 0.9486 | 12.00 | 0.08 | 150 |
| MTE05-4-230X | No FE | 0.8 | 20 | 0.9529 | 7.98 | 0.11 | 73 |
| MTE05-2-32X | No FE | 0.8 | 20 | 0.9574 | 23.13 | 0.16 | 145 |
| MTE05-2-33X | 400 ppm FX9614 | 0.8 | 20 | 0.9578 | 19.50 | 0.15 | 130 |
| MTE05-2-31X | 400 ppm FX9614 | 0.8 | 20 | 0.9535 | 8.42 | 0.10 | 84 |
| MTE05-2-30X | 400 ppm FX9614 | 0.8 | 20 | 0.9537 | 7.01 | 0.10 | 70 |
| D574 AUL336338 | 700 ppm FX9613 | 0.8 | 20 | 0.951 | 3.8 | 0.02 | 191 |
| D574 AUL336274 | 700 ppm FX9613 | 0.8 | 20 | 0.950 | 4.3 | 0.03 | 143 |
| D574 AUL336280 | 700 ppm FX9613 | 0.8 | 20 | 0.950 | 2.8 | 0.01 | 283 |
| Alathon L5005 | | 0.8 | 20 | 0.949 | 8.3 | 0.04 | 207 |
| Alathon L5005 | | 0.5 | 13 | 0.9490 | 8.38 | 0.04 | 210 |
| ExxonMobil HT | | 0.5 | 13 | 0.9524 | 8.75 | 0.05 | 146 |
| Titanex HF-0961 | | 0.5 | 13 | 0.9486 | 12.00 | 0.08 | 150 |
| MTE05-2-230X | No FE | 0.5 | 13 | 0.9529 | 7.98 | 0.11 | 73 |
| MTE05-2-33X | 400 ppm FX9614 | 0.5 | 13 | 0.9578 | 19.50 | 0.15 | 130 |
| MTE05-2-31X | 400 ppm FX9614 | 0.5 | 13 | 0.9535 | 8.42 | 0.10 | 84 |
| MTE05-2-30X | 400 ppm FX9614 | 0.5 | 13 | 0.9537 | 7.01 | 0.10 | 70 |
| D574 AUL336338 | 700 ppm FX9613 | 0.5 | 13 | 0.951 | 3.8 | 0.02 | 191 |
| D574 AUL336274 | 700 ppm FX9613 | 0.5 | 13 | 0.950 | 4.3 | 0.03 | 143 |
| Alathon L5005 | | 0.5 | 13 | 0.949 | 8.3 | 0.04 | 207 |
| Alathon L5005 | | 0.3 | 8 | 0.9490 | 8.38 | 0.04 | 210 |
| ExxonMobil HT | | 0.3 | 8 | 0.9524 | 8.75 | 0.06 | 146 |
| Titanex HF-0961 | | 0.3 | 8 | 0.9486 | 12.00 | 0.08 | 150 |
| MTE05-2-230X | No FE | 0.3 | 8 | 0.9529 | 7.98 | 0.11 | 73 |
| MTE05-2-33X | 400 ppm FX9614 | 0.3 | 8 | 0.9578 | 19.5 | 0.15 | 130 |
| MTE05-2-31X | 400 ppm FX9614 | 0.3 | 8 | 0.9535 | 8.42 | 0.10 | 84 |
| MTE05-2-30X | 400 ppm FX9614 | 0.3 | 8 | 0.9537 | 7.01 | 0.10 | 70 |

In some instances, as indicated in Table 1, the resins contained either Dyneon™ FX9613 or Dyneon™ FX9614 fluoropolymer which is a processing aid commercially available from Dyneon LLC, Oakdale, Minn. The experimental resins are compared, where indicated, to the MW-DPE film resins HTA001HD commercially available from ExxonMobil, TITANEX HP-0961 available from Titan Group and Alathon (Oxy) L5005 available from Equistar which will may be collectively referred to as the comparative resins. The five experimental resins along with three comparative resins were formed into blown film using a PTC BGE blown film with internal bubble cooling. Specifically, the conditions were as follows; a 6-inch die, 0.040 inch die gap, 250 lb.hr/rate, ~80 RPM, 4.0:1 blow up ratio (BUR), 42 inch frost-line height, 210° C. barrel and die set temperatures and 0.8, 0.5 and 0.3 dal in character show relatively narrow distributions of the low and high M, components. In particular, the differences in the GPC overlays at the high $M_w$ end show that none of the experimental resins have the high $M_w$ "tails" seen with the comparative resins. Without wishing to be limited by theory, this may be the consequence of the narrow MWD typically observed with PE produced by metallocene catalysts. The broad and bimodal MWD of the L5005 resin which is produced using a Ziegler-Natta catalyst in a dual reactor is also evident from FIG. 2.

Figure 3:
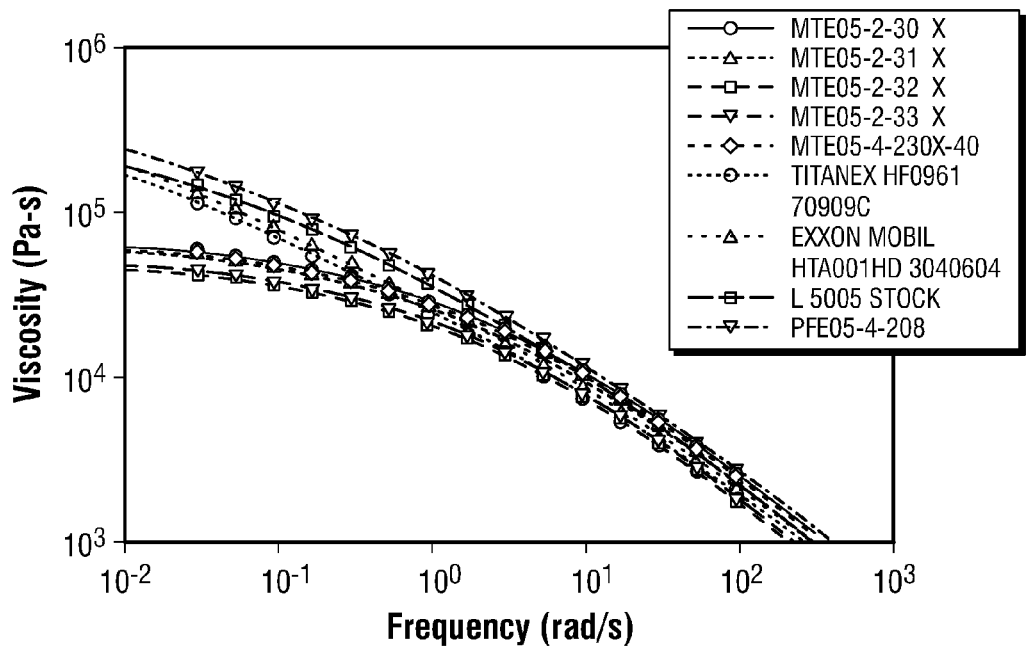
FIG. 3 is a plot of viscosity as a function of frequency for the resins of Example 1.
Figure 4:
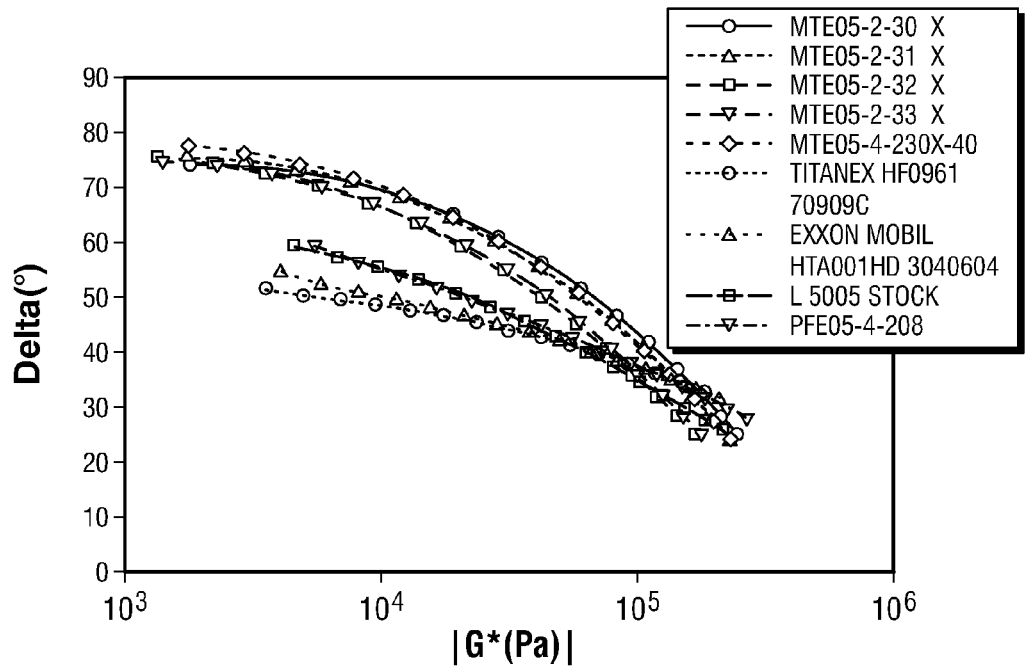
FIG. 4 is a plot of the phase angle as a function of the complex modulus for the resins of Example 1.

FIG. 3 displays the dynamic viscosity behavior of both the experimental and comparative resins. Specifically, FIG. 3 is a plot of the complex viscosity as a function of frequency at 190° C. The rheology data in FIG. 3 shows behavior largely as expected from and in agreement with the GPC data. All the experimental resins while showing similar viscosity profiles at the higher frequency (shear rate) end around 100 rad/s show distinctly different Theological behavior at the low frequency end as is evident in FIG. 3. Without wishing to be limited by theory, this may be a consequence of the narrow MWD, the absence of any high $M_w$ tails and the absence of any significant levels of long chain branching (LCB) in these polymers. The comparative resins show higher low-shear viscosities consistent with a broader MMD, higher $M_w$ tails and varied amounts of LCB. The rheology characteristics of the resins were also evaluated using a van Gurp-Palmen plot. Referring to FIG. 4, the van Gurp-Palmen plot shows the generally higher Delta (phase angle) values at low complex modulus values (G*) for the experimental resins which indicates the much lower elastic character of these resins. The low G* values are related to the low frequency or longer time domain where these elastic differences are most noticeable. The rheology and GPC results for the experimental resins are consistent with the absence of high Mw tail and the lack of LCB in these resins.

Example 2

The impact toughness of the experimental resins at 0.8, 0.5 and 0.3 mil thickness was evaluated and the results of these measurements are shown in Table 2. The impact toughness was evaluated using the total energy dart drop test, the dart drop test and the Spencer impact test according to ASTM D4272, D1709 and D3420 respectively.

gages tested. For example as the HLML decreases from ~23 for the experimental resin MTE05-32X to ~7 for experimental resin MTE05-30X the dart impact increases from 140 g to 248 g respectively for the 0.8 mil film data set. Likewise, the TEDD for the same resins increases from 0.5 ft-lbf to 1.4 ft-lbf. These results are unexpected when considering the high toughness values of the film formed from these experimental resins are achieved despite the resin's relatively high densities, see Table 1.

The results demonstrate that the films formed from the experimental resins display a higher degree of impact toughness than the films formed from the comparative resins. Specifically, if we consider comparative resin L5005 (~8 HLMI, 0949 g/cm³ density) in comparison to the experimental resin MTE05-31X (~8 HLMI, 0.954 g/cm³ density) the films formed from the experimental resin exhibited much higher impact properties at all gages. The increased impact toughness of the films formed from the experimental resins is also evident when the impact properties are gage-normalized. These values are also presented in Table 2 as n-Dart Ipact, n-Spencer Impact, and n-TEDD. The gage normalized values specifically refer to the as measured impact properties for each film at each (as made) gage, normalized on a per unit (one mil) basis. Evaluating the impact properties using the gage normalized values demonstrates the increased impact toughness of the films formed from the experimental resins and further shows an increase in the impact performance with decreasing film thickness. For example, films formed from

TABLE 2

| Resin Description | Comments | Film Gage (mil) | Dart Impact (g) | n-Dart Impact (g) | Spencer Impact (J) | n-Spencer Impact (J/mil) | TEDD (ft.lb) | n-TEDD (ft.lbf/mil) | MD Tear (g) | TD Tear (g) |
|---|---|---|---|---|---|---|---|---|---|---|
| Alathon L5005 | | 0.8 | 162 | 203 | 0.51 | 0.6 | 0.679 | 0.8 | 9.3 | 138.7 |
| ExxonMobil HTA001HD | | 0.8 | 132 | 165 | 0.42 | 0.5 | 0.496 | 0.6 | 9.0 | 141.5 |
| Titanex HF-0961 | | 0.8 | <50 | <63 | 0.23 | 0.3 | 0.226 | 0.3 | 7.0 | 173.9 |
| MTE05-4-230X | no FE | 0.8 | 64 | 80 | 0.31 | 0.4 | 0.277 | 0.3 | 7.6 | 253.6 |
| MTE05-2-32X | no FE | 0.8 | 140 | 175 | 0.39 | 0.5 | 0.467 | 0.6 | 11.5 | 155.8 |
| MTE05-2-33X | 400 ppm FX9614 | 0.8 | 148 | 185 | 0.43 | 0.5 | 0.644 | 0.8 | 8.3 | 164.5 |
| MTE05-2-31X | 400 ppm FX9614 | 0.8 | 206 | 258 | 0.58 | 0.7 | 1.051 | 1.3 | 9.8 | 224.8 |
| MTE05-2-30X | 400 ppm FX9614 | 0.8 | 248 | 310 | 0.68 | 0.9 | 1.394 | 1.7 | 11.4 | 85.1 |
| D574 AUL336338 | 700 ppm FX9613 | 0.8 | 78 | 98 | 0.36 | 0.5 | 0.643 | 0.8 | 7.9 | 56.9 |
| D574 AUL336274 | 700 ppm FX9613 | 0.8 | 110 | 138 | 0.43 | 0.5 | 0.700 | 0.9 | 10.8 | 67.0 |
| D574 AUL336280 | 700 ppm FX9613 | 0.8 | 138 | 173 | 0.38 | 0.5 | 0.691 | 0.9 | 7.6 | 26.1 |
| Alathon 15005 | | 0.8 | 164 | 205 | 0.54 | 0.7 | 1.070 | 1.3 | 13.3 | 128.1 |
| Alathon 15005 | | 0.5 | 126 | 252 | 0.36 | 0.7 | 0.682 | 1.4 | 4.5 | 97.7 |
| ExxonMobil HTA001HD | | 0.5 | 64 | 128 | 0.21 | 0.4 | 0.276 | 0.6 | 3.4 | 64.9 |
| Titanex HF-0961 | | 0.5 | <50 | <100 | 0.15 | 0.3 | 0.147 | 0.3 | 3.0 | 106.2 |
| MTE05-4-230X | no FE | 0.5 | <50 | <100 | 0.21 | 0.4 | 0.181 | 0.4 | 6.5 | 105.3 |
| MTE05-2-33X | 400 ppm FX9614 | 0.5 | 134 | 268 | 0.46 | 0.9 | 0.645 | 1.3 | 5.1 | 153.1 |
| MTE05-2-31X | 400 ppm FX9614 | 0.5 | 198 | 396 | 0.61 | 1.2 | 0.908 | 1.8 | 5.8 | 132.0 |
| MTE05-2-30X | 400 ppm FX9614 | 0.5 | 208 | 416 | 0.73 | 1.5 | 1.173 | 2.3 | 6.6 | 56.9 |
| D574 AUL336338 | 700 ppm FX9613 | 0.5 | 60 | 120 | 0.26 | 0.5 | 0.519 | 1.0 | 4.3 | 30.8 |
| D574 AUL336274 | 700 ppm FX9613 | 0.5 | <50 | <100 | 0.19 | 0.4 | 0.240 | 0.5 | 33 | 56.6 |
| Alathon L5005 | | 0.5 | 100 | 200 | 0.35 | 0.7 | 0.825 | 1.7 | 5.7 | 91.6 |
| Alathon L5005 | | 0.3 | 114 | 380 | 0.30 | 1.0 | 0.463 | 1.5 | 2.1 | 24.9 |
| ExxonMobil HTA001HD | | 0.3 | 64 | 213 | 0.19 | 0.6 | 0.276 | 0.9 | 1.9 | 18.5 |
| Titanex HF-0961 | | 0.3 | <50 | <167 | 0.15 | 0.5 | 0.148 | 0.5 | 2.3 | 51.1 |
| MTE05-2-230X | no FE | 0.3 | <50 | <367 | 0.15 | 0.5 | 0.150 | 0.5 | 2.7 | 105.4 |
| MTE05-2-33X | 400 ppm FX9614 | 0.3 | 94 | 313 | 0.25 | 0.8 | 0.465 | 1.6 | 2.5 | 110.8 |
| MTE05-2-31X | 400 ppm FX9614 | 0.3 | 130 | 433 | 0.51 | 1.7 | 0.850 | 2.8 | 2.1 | 48.6 |
| MTE05-2-30X | 400 ppm FX9614 | 0.3 | 156 | 520 | 0.63 | 2.1 | 0.876 | 2.9 | 2.9 | 34.8 |

The data in Table 2 shows that for all three gages, the experimental resins produced films exhibiting very good toughness properties and show a systematic trend of increasing toughness with increasing $M_w$. The data also indicate the films formed from experimental resins exhibit increasing toughness with decreasing HLMI. These trends are true for all MTE05-31X increases in n-Dart impact from 258 g/mil to 396 g/mil to 433 g/mil for the 0.8, 0.5 and 0.3 mil films respectively. Thus in effect, the impact toughness of the film is increasing with decreasing film thickness.

Table 2 also indicates the films formed from the experimental resins exhibit good tear strengths in both the MD and TD. In particular, the films formed from the experimental resins TD tear strengths are generally equal to or better than the films formed from the comparative resins as shown in Table 2. For example, the TD tear of the film formed from experimental resin MTE05-31X is 164.5 g compared to 138.7 g for the film formed from comparative resin L5005 at 0.8 mil gage. The TD tear strength of the MTE05-31X film is significantly higher than that of L5005 film at all gages.

Example 3

The barrier properties of the films formed from experimental resins at 0.8, 0.5 and 0.3 mil thickness was evaluated and the results of these measurements are shown in Table 3. The MVTR and OTR were evaluated in accordance with ASTM F1249 and D 3985 respectively.

recoverable shear strain, $\gamma_{2s}$, for a rubberlike (Lodge) liquid can be stated to be equal to $$\gamma_\infty = \frac{N_1}{2\tau} \qquad \text{Eqn. (2)}$$

where $N_1$ is the first normal stress difference and $\tau$ is the shear stress as discussed in the book by J. M. Dealy, K. F. Wissbrun, "Melt Rheology and its Role in Plastics Processing: Theory and Applications", Van Nostrand Reinhold, New York, (1990) which is incorporated by reference herein in its entirety. At low frequencies, the recoverable shear can be estimated to be equal to

TABLE 3

| Resin Description | Comments | Film Gage (mil) | MVTR @ 100° F. and 90% DH (g · mil/100 sq. in./day) | OTR @ 73° F. (cm3 · mil/ 100 sq. in./day) | Eto(0) (Pa.s) | Tau (s) | a | Recoverable Shear |
|---|---|---|---|---|---|---|---|---|
| Alathon L5005 | | 0.8 | 1.02 | 514 | 5.35E+05 | 4.8350 | 0.292 | 449 |
| ExxonMobil HTA001HD | | 0.8 | 0.88 | 421 | 2.72E+06 | 13.7100 | 0.169 | 560 |
| Titanex HF-0961 | | 0.8 | 0.92 | 501 | 6.06E+06 | 23.9900 | 0.159 | 557 |
| MTE05-4-230X | no FE | 0.8 | 0.85 | 333 | 6.93E+04 | 0.4830 | 0.511 | 131 |
| MTE05-2-32X | no FE | 0.8 | 0.62 | 367 | 5.54E+04 | 0.5020 | 0.470 | 156 |
| MTE05-2-33X | 400 ppm FX9614 | 0.8 | 0.64 | 330 | 5.75E+04 | 0.4858 | 0.468 | 155 |
| MTE05-2-31X | 400 ppm FX9614 | 0.8 | 0.68 | 303 | 6.89E+04 | 0.4681 | 0.492 | 139 |
| MTE05-2-30X | 400 ppm FX9614 | 0.8 | 0.70 | 310 | 7.23E+04 | 0.4273 | 0.478 | 141 |
| D574 AUL336338 | 700 ppm FX9613 | 0.8 | — | — | 3.99E+05 | 26.8400 | 0.194 | 588 |
| D574 AUL336274 | 700 ppm FX9613 | 0.8 | — | — | 3.97E+06 | 28.1200 | 0.192 | 591 |
| D574 AUL336280 | 700 ppm FX9613 | 0.8 | — | — | 6.93E+06 | 56.3000 | 0.194 | 625 |
| Alathon l5005 | | 0.8 | — | — | 5.66E+05 | 4.7890 | 0.298 | 445 |
| Alathon l5005 | | 0.5 | 0.91 | 434 | 5.35E+05 | 4.8350 | 0.292 | 449 |
| ExxonMobil HTA001HD | | 0.5 | 1.09 | 502 | 2.72E+06 | 33.7100 | 0.169 | 560 |
| Titanex HF-0961 | | 0.5 | 0.96 | 486 | 6.06E+06 | 23.9900 | 0.139 | 587 |
| MTE05-4-230X | no FE | 0.5 | 0.62 | 306 | 6.93E+04 | 0.4830 | 0.511 | 131 |
| MTE05-2-33X | 400 ppm FX9614 | 0.5 | 0.62 | 359 | 5.75E+04 | 0.4858 | 0.468 | 155 |
| MTE05-2-31X | 400 ppm FX9614 | 0.5 | 0.68 | 309 | 6.89E+04 | 0.4681 | 0.492 | 139 |
| MTE05-2-30X | 400 ppm FX9614 | 0.5 | 0.63 | 361 | 7.23E+04 | 0.4273 | 0.478 | 141 |
| D574 AUL336338 | 700 ppm FX9613 | 0.5 | — | — | 3.99E+06 | 26.8400 | 0.194 | 588 |
| D574 AUL336274 | 700 ppm FX9613 | 0.5 | — | — | 3.97E+06 | 28.1200 | 0.192 | 591 |
| Alathon L5005 | | 0.5 | — | — | 5.65E+05 | 4.7890 | 0.298 | 445 |
| Alathon l5005 | | 0.3 | 1.09 | 465 | 5.35E+05 | 4.8350 | 0.292 | 449 |
| ExxonMobil HTA001HD | | 0.3 | 0.95 | 610 | 2.72E+05 | 13.7100 | 0.169 | 560 |
| Titanex HF-0961 | | 0.3 | 1.05 | 644 | 6.05E+06 | 23.9900 | 0.139 | 597 |
| MTE05-2-230X | no FE | 0.3 | 0.73 | 376 | 6.93E+04 | 0.4830 | 0.511 | 131 |
| MTE05-2-33X | 400 ppm FX9614 | 0.3 | 0.62 | 351 | 5.75E+04 | 0.4858 | 0.468 | 155 |
| MTE05-2-31X | 400 ppm FX9614 | 0.3 | 0.51 | 301 | 6.89E+04 | 0.4681 | 0.492 | 139 |
| MTE05-2-30X | 400 ppm FX9614 | 0.3 | 0.62 | 351 | 7.23E+04 | 0.4273 | 0.478 | 141 |

The results demonstrate the films formed from experimental resins at all gages exhibited significantly better (i.e. lower) MVTR and OTR than the films formed from comparative resins. Specifically the MVTR and OTR properties of the films formed from experimental resins are reduced by approximately 30% to 40% when compared to films formed from resins such as L5005. Without wishing to be limited by theory, while the higher density of the experimental resins may be partly responsible for the improved barrier properties, the density does not appear to be the primary factor as a comparative resin HTA001 and experimental resin MTE05-31X having similar HLMIs and densities exhibit markedly differing barrier properties.

To elucidate the rheological differences among the resins in a more quantitative manner, an estimation of the recoverable shear strain parameter was undertaken. Formally, the $$\gamma_\infty \sim \frac{G'}{\omega|\eta^*|} \qquad \text{Eqn. (3)}$$

where G' represents the elastic part of the dynamic shear modulus while $|\eta^*|$ and $\omega$ represent the magnitudes of the corresponding complex viscosity (using the Cox-Merz rule) and frequency, respectively. Applying this approximation in the low frequency range ($\omega$=0.03 s$^{-1}$) the values for recoverable shear strain parameter were obtained for each resin. The choice of the low frequency at which $\gamma_\infty$ was estimated rests in the fact that differences in the elastic character of various melts are magnified at low frequencies (or shear rates) since they probe the longest relaxation time behavior at these conditions. Furthermore, the approximation in equation (2) above is only valid at very low frequencies or shear rates. The values of the recoverable shear reported in Table 3 were obtained as described above using equation 3, and were multiplied by a constant factor of 1000.

Example 4

The tensile properties of the films formed from experimental resins at 0.8, 0.5 and 0.3 mil thickness was evaluated and the results of these measurements are shown in Table 4. Specifically, the film stiffness was measured by determining the 1% Secant Modulus in the MD and TD accordance with ASTM D882.

the MD and TD of the experimental resins are similar to those observed for the comparative resins as shown in Table 4.

The results demonstrate that all three gages, the films formed from the experimental resins exhibit significantly higher MD and TD moduli values than the films formed from comparative resins. For example, at 0.3 mil gage, films formed from L5005, TITANEX and HTA001 resins exhibit MD modulus values in the range of 130 Kpsi to 160 Kpsi while the films formed from experimental resins exhibit MD modulus values in the range of 170 Kpsi to 217 Kpsi. Simi-

TABLE 4

| Resin Description | Comments | Film Gage (mil) | MD Yield Strength (psi) | MD Yield Strain (%) | MD Break Strength (psi) | MD Break Strain (%) | TD Yield Strength (psi) | TD Yield Strain (%) | TD Break Strength (psi) | TD Break Strain (%) | 1% MD Secant Modulus (psi) | 1% TD Secant Modulus (psi) |
|---|---|---|---|---|---|---|---|---|---|---|---|---|
| Alathon L5005 | | 0.8 | 4,989.00 | 13.36 | 7,941.60 | 253.52 | 4,447.06 | 5.80 | 5,857.42 | 488.30 | 127,608.04 | 138,973.40 |
| ExxonMobil HTA001HD | | 0.8 | 4,555.93 | 14.74 | 6,800.67 | 190.74 | 4,293.71 | 5.81 | 6,068.85 | 459.15 | 119,350.19 | 156,503.97 |
| Titanex HF-0961 | | 0.8 | 4,765.84 | 13.75 | 7,429.43 | 212.92 | 4616.55 | 5.85 | 4,685.07 | 404.54 | 109,325.17 | 152,272.04 |
| MTE05-4-230X | no FE | 0.8 | 5,030.74 | 9.49 | 6,782.53 | 225.98 | 4851.38 | 4.49 | 4,031.90 | 305.15 | 144,930.09 | 190,037.82 |
| MTE05-2-32X | no FE | 0.8 | 5,330.44 | 13.72 | 9,301.60 | 195.38 | 4551.82 | 4.56 | 6,430.53 | 399.55 | 144,897.72 | 181,776.85 |
| MTE05-2-33X | 400 ppm FX9614 | 0.8 | 5,462.50 | 11.51 | 7,727.99 | 225.51 | 5,180.68 | 4.30 | 4,921.05 | 340.30 | 157,101.92 | 204,936.33 |
| MTE05-2-31X | 400 ppm FX9614 | 0.8 | 5,793.13 | 12.56 | 8,436.26 | 204.39 | 5,098.94 | 4.22 | 6,184.51 | 427.05 | 156,572.35 | 193,123.32 |
| MTE05-2-30X | 400 ppm FX9614 | 0.8 | 5,626.62 | 12.28 | 7,549.41 | 197.61 | 4,952.95 | 4.80 | 6,099.76 | 401.29 | 148,954.76 | 227,779.98 |
| D574 AUL336338 | 700 ppm FX9613 | 0.8 | 6,093.20 | 17.49 | 6,990.23 | 138.16 | 4,558.71 | 6.45 | 5,428.37 | 375.12 | 143,730.92 | 153,149.59 |
| D574 AUL336274 | 700 ppm FX9613 | 0.8 | 5,027.04 | 16.57 | 5,819.52 | 147.07 | 4,370.51 | 6.99 | 5,439.48 | 398.66 | 137,089.71 | 151,996.75 |
| D574 AUL336280 | 700 ppm FX9613 | 0.8 | 6,506.28 | 16.50 | 7,221.57 | 102.00 | 4,273.28 | 6.36 | 5,025.24 | 334.19 | 164,360.67 | 151,980.50 |
| Alathon 15005 | | 0.8 | 4,704.93 | 15.87 | 7,295.87 | 251.67 | 4,463.12 | 6.35 | 5,563.20 | 344.35 | 126,022.13 | 146,612.39 |
| Alathon 15005 | | 0.5 | 6,754.81 | 13.20 | 10,360.12 | 188.83 | 4,341.50 | 6.08 | 5,870.16 | 418.91 | 134,985.54 | 157,050.28 |
| ExxonMobil HTA001HD | | 0.5 | 6,381.38 | 12.72 | 9,126.31 | 129.56 | 4,470.53 | 5.84 | 5,855.21 | 431.83 | 160,658.33 | 166,367.08 |
| Titanex HF-0961 | | 0.5 | 5,439.11 | 11.87 | 8,214.38 | 145.37 | 4,210.67 | 5.76 | 5,052.27 | 474.93 | 133,183.44 | 148,931.68 |
| MTE05-4-230X | no FE | 0.5 | 5,833.20 | 12.53 | 7,858.59 | 148.03 | 4,616.57 | 4.67 | 4,142.49 | 281.00 | 154,532.87 | 166,902.65 |
| MTE05-2-33X | 400 ppm FX9614 | 0.5 | 6,479.28 | 11.28 | 8,280.77 | 168.11 | 4,506.42 | 4.52 | 4,368.97 | 328.35 | 146,749.97 | 199,268.00 |
| MTE05-2-31X | 400 ppm FX9614 | 0.5 | 6,350.51 | 11.51 | 10,035.84 | 176.83 | 4,862.57 | 3.81 | 5,670.88 | 397.64 | 153,960.42 | 192,875.42 |
| MTE05-2-30X | 400 ppm FX9614 | 0.5 | 6,774.31 | 12.11 | 10,396.28 | 175.61 | 4,678.05 | 4.88 | 5,672.22 | 389.21 | 172,040.19 | 213,587.24 |
| D574 AUL336338 | 700 ppm FX9613 | 0.5 | 6,789.52 | 18.06 | 7,743.96 | 112.23 | 4,626.51 | 6.57 | 5,506.23 | 327.90 | 161,570.17 | 150,688.25 |
| D574 AUL336274 | 700 ppm FX9613 | 0.5 | 7,276.95 | 16.29 | 8,515.85 | 100.46 | 4,035.11 | 5.67 | 4,551.96 | 416.50 | 157,102.36 | 164,624.63 |
| Alathon L5005 | | 0.5 | 5,147.49 | 15.18 | 8,206.95 | 226.51 | 4,359.67 | 6.37 | 5,5503.28 | 424.20 | 126,286.24 | 167,422.41 |
| Alathon L5005 | | 0.3 | 7,590.49 | 14.51 | 9,677.27 | 94.18 | 4,001.72 | 8.04 | 5,669.71 | 337.04 | 142,396.50 | 130,472.15 |
| ExxonMobil HTA001HD | | 0.3 | 7,590,49 | 10.09 | 9,839.68 | 70.92 | 3,483.61 | 7.68 | 4,179.79 | 368.91 | 256,809.58 | 165,958.38 |
| Titanex HF-0961 | | 0.3 | 7,357.38 | 13.45 | 9,801.20 | 102.61 | 3,538.20 | 6.17 | 3,668.85 | 344.28 | 135,516.18 | 153,311.22 |
| MTE05-2-230X | no FE | 0.3 | 7,234.79 | 10.73 | 8,693.84 | 126.40 | 4,481,36 | 4.61 | 3,739.99 | 248.78 | 173,757.64 | 173,081.33 |
| MTE05-2-33X | 400 ppm FX9614 | 0.3 | 6,389.17 | 9.66 | 8,720.24 | 135.32 | 5,097.91 | 4.97 | 4,760.55 | 252.97 | 189,441.54 | 174,399.03 |
| MTE05-2-31X | 400 ppm FX9614 | 0.3 | 6,304.61 | 12.93 | 11,138.54 | 104.60 | 4,436.61 | 4.29 | 5,338.61 | 288.29 | 191,160.04 | 189,284.21 |
| MTE05-2-30X | 400 ppm FX9614 | 0.3 | 7,028.08 | 11.57 | 11,718.85 | 124.41 | 5,254.51 | 4.71 | 7,341.28 | 365.70 | 217,517.78 | 205,959.65 |

The yield strength refers to the stress a material can withstand without permanent deformation of the material while the yield strain refers to amount of deformation elongation that occurs without permanent deformation of the material. The break strength refers to the tensile stress corresponding to the point of rupture while the break strain refers to the tensile elongation corresponding to the point of rupture. The yield strength, yield strain, break strength and break strain both in larly, the TD modulus values for the comparative films range from 130 Kpsi to 165 Kpsi while those of the experimental films range from 206 Kpsi to 270 Kpsi.

Without further elaboration, it is believed that one skilled in the art can, using the description herein, utilize the present invention to its fullest extent. While inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The disclosues of all patents, patent applications, and publications cited herein are hereby incorporated by reference, to the extent that they provide exemplary, procedural or other details supplementary to those set forth herein.

What is claimed is:

1. A polyethylene film comprising a polymer composition, the film having the following characteristics:
    a total energy dart drop, measured in accordance with ASTM D4272, of greater than about 0.45 ft.lbf;
    a dart drop impact strength, measured in accordance with ASTM D1709 Method A, of greater than about 135 g; and
    a moisture vapor transmission rate, measured in accordance with ASTM F1249 at 100° F. and 90% relative humidity, of less than about 0.85 g-mil/100 square inch/24 hr,
    wherein said ASTM tests are performed on a test specimen having a 0.8 mil thickness,
    wherein the polymer composition has a density of equal to or greater than 0.940 g/cc, and
    wherein the polymer composition has a Carreau-Yasuda equation "a" parameter value of greater than 0.3 when the dynamic complex viscosity versus frequency scan data obtained at 190° C. are fitted to the Carreau-Yasuda equation with an n value of 0.1818.

2. The film of claim 1 wherein the polymer composition comprises a copolymer of ethylene and an alpha olefin comonomer.

3. The film of claim 2 wherein the alpha olefin comonomer comprises 1-butene, 1-pentene, 1-hexene, 3-methyl-1-butene, 4-methyl-1-pentene, 1-heptene, 1-octene, 1-nonene, 1-decene or combinations thereof.

4. The film of claim 1 further comprising a Spencer impact of greater than about 0.35 J as determined in accordance with ASTM D3420.

5. The film of claim 1 further comprising an oxygen transmission rate of equal to or less than about 400 cm$^3$-mil/100 sq. in./day as determined in accordance with ASTM D3985.

6. The film of claim 1 further comprising a 1% transverse direction secant modulus of greater than about 170,000 psi as determined in accordance with ASTM D882.

7. The film of claim 1 further comprising a 1% machine direction secant modulus of greater than about 130,000 psi as determined in accordance with ASTM D882.

8. The film of claim 1 wherein the polymeric composition has a weight average molecular weight of from about 180,000 g/mol to about 350,000 g/mol.

9. The film of claim 1 wherein the polymeric composition is multimodal.

10. The film of claim 1 wherein the polymeric composition is bimodal.

11. The film of claim 1 further comprising an Elmendorf tear strength in the transverse direction of equal to or greater than about 85 g as determined in accordance with ASTM D1922.

12. The film of claim 1 wherein the polymeric composition has an "eta zero" value of less than about $4 \times 10^5$ Pa.s when the dynamic complex viscosity versus frequency scan data are fitted to the Carreau-Yasuda equation with an n=0.1818 value.

13. The film of claim 1 wherein the polymeric composition has a "tau eta" value of less than about 5 s when the dynamic complex viscosity versus frequency scan data are fitted to the Carreau-Yasuda equation with an n=0.1818 value.

14. The film of claim 1 further comprising a dart drop impact of greater than about 200 g as determined in accordance with ASTM D1709, Method A.

15. A polyethylene film comprising a polymer composition, the film having the following characteristics:
    a total energy dart drop, measured in accordance with ASTM D4272, of greater than about 0.45 ft.lbf;
    a dart drop impact strength, measured in accordance with ASTM D1709 Method A, of greater than about 135 g; and
    an oxygen transmission rate, measured in accordance with ASTM D3985 at 73° F. and 0% relative humidity, of less than about 400 cm$^3$-mil/100 square inch/24 hr,
    wherein said ASTM tests are performed on a test specimen having a 0.8 mil thickness,
    wherein the polymer composition has a density of equal to or greater than 0.940 g/cc, and
    wherein the polymer composition has a Carreau-Yasuda equation "a" parmeter value of greater than 0.3 when the dynamic complex viscosity versus frequency scan data obtained at 190° C. are fitted to the Carreau-Yasuda equation with an n value of 0.1818.

16. A polyethylene film comprising a polymer composition, the film having the following characteristics:
    a total energy dart drop, measured in accordance with ASTM D4272, of greater than about 0.45 ft.lbf;
    a dart drop impact strength, measured in accordance with ASTM D1709 Method A, of greater than about 135 g; and
    a 1% machine direction secant modulus, measured in accordance with ASTM D882 at 10.2 mm/min, of equal to or greater than about 130,000 psi,
    wherein said ASTM tests are performed on a test specimen having a 0.8 mil thickness, and wherein the polymer composition has a Carreau-Yasuda equation "a" parameter value of greater than 0.3 when the dynamic complex viscosity versus frequency scan data obtained at 190° C. are fitted to the Carreau-Yasuda equation with an n value of 0.1818.

17. A polyethylene film comprising a polymer composition, the film having the following characteristics:
    a total energy dart drop, measured in accordance with ASTM D4272, of greater than about 0.45 ft.lbf a dart drop impact strength, measured in accordance with ASTM D1709 Method A, of greater than about 135 g; and a 1% transverse direction secant modulus, measured in accordance with ASTM D882 at 10.2 mm/min, of equal to or greater than about 170,000 psi, wherein said ASTM tests are performed on a test specimen having a 0.8 mil thickness, and wherein the polymer composition has a Carreau-Yasuda equation "a" parameter value of greater than 0.3 when the dynamic complex viscosity versus frequency scan data obtained at 190° C. are fitted to the Carreau-Yasuda equation with an n value of 0.1818.

18. A polyethylene film comprising a polymer composition having:
(a) an "a" value of greater than about 0.45;
(b) an "eta zero" value of less than about $4 \times 10^5$ Pa.s;
(c) a "tau eta" value of less than about 5s; and
(d) a density of equal to or greater than 0.940 g/cc when the dynamic complex viscosity versus frequency data obtained at 190° C. is fitted to the Carreau-Yasuda equation with an n value of 0.1818, wherein the polyethylene film displays a moisture vapor transmission rate equal to or less than about 0.85 g-mil/100 sq. in/day determined in accordance with ASTM F 1249 and a total energy dart drop impact of equal to or greater than about 1.0 ft.lbf as determined in accordance with ASTM D4272 when performed on a test specimen having a 0.8 mil thickness.

19. The polyethylene film of claim 1 wherein the polymer composition comprises a higher molecular weight ethylene/1-olefin copolymer component and a lower molecular weight ethylene/1-olefin copolymer component.

20. A polyethylene film comprising a polymer composition having:
(a) an "a" value of greater than about 0.45;
(b) an "eta zero" value of less than about $4 \times 10^5$ Pa.s;
(c) a "tau eta" value of less than about 5 s; and
(d) a density of equal to or greater than 0.940 g/cc when the dynamic complex viscosity versus frequency data obtained at 190° C. is fitted to the Carreau-Yasuda equation with an n value of 0.1818, wherein the polyethylene film displays:
(i) a moisture vapor transmission rate equal to or less than about 0.85 g-mil/100 sq. in/day determined in accordance with ASTM F 1249;
(ii) an oxygen transmission rate equal to or less than about 400 $cm^3$-mil/100 sq. in/day determined in accordance with D 3985; and
(iii) a total energy dart drop impact of equal to or greater than about 0.45 ft.lbf as determined in accordance with ASTM D4272, when performed on a test specimen having a 0.8 mil thickness.

* * * * *